United States Patent
Cleron et al.

(10) Patent No.: US 8,732,624 B2
(45) Date of Patent: May 20, 2014

(54) PROTECTION FOR UNINTENTIONAL INPUTS

(71) Applicant: Google Inc., Mountain View, CA (US)

(72) Inventors: Michael Andrew Cleron, Menlo Park, CA (US); James Brooks Miller, Sunnyvale, CA (US); Daniel Marc Gatan Shiplacoff, Los Altos, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/735,751

(22) Filed: Jan. 7, 2013

(65) Prior Publication Data

US 2014/0082534 A1 Mar. 20, 2014

Related U.S. Application Data

(60) Provisional application No. 61/703,741, filed on Sep. 20, 2012.

(51) Int. Cl.
*G06F 3/048* (2013.01)

(52) U.S. Cl.
USPC .......................................... 715/863; 715/864

(58) Field of Classification Search
CPC ...................................................... G06F 3/0488
USPC ................................................. 715/864, 863
See application file for complete search history.

(56) References Cited

U.S. PATENT DOCUMENTS

| | | | |
|---|---|---|---|
| 2010/0125785 A1* | 5/2010 | Moore et al. | 715/702 |
| 2012/0131508 A1 | 5/2012 | Lee | |
| 2013/0027316 A1* | 1/2013 | Akella | 345/173 |

FOREIGN PATENT DOCUMENTS

| | | |
|---|---|---|
| EP | 1959338 A2 | 8/2008 |
| EP | 2490116 A1 | 8/2012 |

OTHER PUBLICATIONS

"iClarified a Look at the New Lock Screen Camera Launch in iOS 5.1 [Video]," Retrieved from http://www.iclarified.com/entry/index.php?enid=20520, accessed on Aug. 31, 2012, 2 pp.

Rehman, "Add Home Screen Widgets to Android Lock Screen With Generic Lockscreen," Retrieved from http://www.addictivetips.com/mobile/add-home-screen-widgets-to-android-lock-screen-with-generic-widget-lockscreen/, accessed on Aug. 31, 2012, 3 pp.

"WidgetLocker Lockscreen, TeslaCoil Software," Retrieved from https://play.google.com/store/apps/details?id=com.teslacoilsw.widgetlocker&hl=en, accessed on Aug. 31, 2012, 2 pp.

(Continued)

*Primary Examiner* — Andrea Leggett

(74) *Attorney, Agent, or Firm* — Shumaker & Sieffert, P.A.

(57) ABSTRACT

A computing device is described that outputs for display at a presence-sensitive screen a lock screen graphical user interface. The lock screen graphical user interface includes an unlock region and a widget region including a first widget. The computing device receives an indication of a user input received at a location of the presence-sensitive screen within the widget region. The computing device determines a characteristic of the user input including at least one of a shape, a length, a velocity, and an acceleration. Responsive to determining that the determined characteristic exceeds a threshold, the computing device outputs for display an updated widget region of the lock screen graphical user interface that includes a second widget.

20 Claims, 5 Drawing Sheets

(56) References Cited

OTHER PUBLICATIONS

"All in One Cydget—Live Your iPhone Lockscreen," Retrieved from http://www.ihackintosh.com/2010/01/all-in-one-cydget-live-your-iphone-lockscreen/, accessed on Aug. 31, 2012, 5 pp.

"Sweet lockscreen widget iPhone iPod," Retrieved from http://www.youtube.com/watch?v=XYnO51FsNeQ, accessed on Aug. 31, 2012, 3 pp.

"Photo library browser widget on lockscreen," Retrieved from https://www.google.com/search?q=photo+library+browser+widget+on+lockscreen&hl=en&client=firefox-a&hs=4cR&rls=org.mozilla:en-, accessed on Aug. 31, 2012, 5 pp.

"Get Sense 3.0 Lockscreen + Top 10 Best New Android Apps," Retrieve from http://www.youtube.com/watch? v=ees0YljGySo, accessed on Sep. 19, 2012, 3 pp.

"What if iPhone had . . . Dashboard Widgets," Retrieved from http://www.youtube.com/watch?v=7_1quYGZPvg, accessed on Sep. 19, 2012, 3 pp.

Office Action from U.S. Appl. No. 13/741,098, dated May 6, 2013, 26 pp.

Response to Office Action dated May 6, 2013, from U.S. Appl. No. 13/741,098, filed Aug. 5, 2013, 13 pp.

International Search Report and Written Opinion of International Application No. PCT/US2013/057114, mailed Dec. 16, 2013, 9 pp.

* cited by examiner

PROTECTION FOR UNINTENTIONAL INPUTS

This application claims the benefit of U.S. Provisional Application No. 61/703,741, filed Sep. 20, 2012, the entire content of which is hereby incorporated by reference.

BACKGROUND

Computing devices can perform various functions, such as executing applications stored at the computing device and outputting information (e.g., documents, e-mails, and pictures) for display (e.g., on a screen). Certain computing devices can include a limited access state that prevents an unauthorized user from accessing applications and information stored at the computing device, thereby effectively "locking" the computing device. For example, some computing devices require a user to provide a specific input to lock and/or unlock the device.

In addition to security, locking techniques can be useful to prevent inadvertent inputs by an otherwise authorized user. For example, the user may carry a computing device, such as a mobile phone, in a pocket. Locking techniques may prevent the computing device from performing various actions in response to detecting accidental user input (e.g., when a user accidentally presses a button, taps a touch screen, or inadvertently activates a presence-sensitive screen while the mobile phone is in the user's pocket).

While locking techniques can provide security to information and also protection from accidental user inputs, locking techniques generally prevent immediate access to applications and information stored at the computing device. For example, when a computing device is "locked," a user must perform, at a minimum, one extra step to "unlock" the computing device before the computing device will permit access to the applications and information stored at the computing device.

SUMMARY

In one example, the disclosure is directed to a method that may include outputting, by a computing device and for display at a presence-sensitive screen, a lock screen graphical user interface. The lock screen graphical user interface may include a widget region and an unlock region. The widget region may include a first widget. The method may further include receiving, by the computing device, an indication of a user input received at a location of the presence-sensitive screen within the widget region. The method may further include determining, based on the indication of the user input and by the computing device, a characteristic of the user input. The determined characteristic of the user input may include at least one of a shape, a length, a velocity, and an acceleration. In response to determining that the determined characteristic exceeds a threshold, the method may further include outputting, for display, by the computing device, an updated widget region of the lock screen graphical user interface that includes a second widget.

In another example, the disclosure is directed to a computing device comprising one or more processors. The one or more processors being configured to output for display at a presence-sensitive screen, a lock screen graphical user interface. The lock screen graphical user interface may include a widget region and an unlock region. The widget region may include a first widget. The one or more processors being further configured to receive an indication of a user input received at a location of the presence-sensitive screen within the widget region. The one or more processors being further configured to determine, based on the indication of the user input, a characteristic of the user input. The determined characteristic of the user input may include at least one of a shape, a length, a velocity, and an acceleration. In response to determining that the determined characteristic exceeds a threshold, the one or more processors being further configured to output, for display, an updated widget region of the lock screen graphical user interface that includes a second widget.

In another example, the disclosure is directed to a computer-readable storage medium comprising instructions that, when executed configure one or more processors of a computing device to output for display at a presence-sensitive screen, a lock screen graphical user interface. The lock screen graphical user interface may include a widget region and an unlock region. The widget region may include a first widget. The instructions, when executed may further configure the one or more processors of the computing device to receive an indication of a user input received at a location of the presence-sensitive screen within the widget region. The instructions, when executed may further configure the one or more processors of the computing device to determine, based on the indication of the user input, a characteristic of the user input. The determined characteristic of the user input may include at least one of a shape, a length, a velocity, and an acceleration. In response to determining that the determined characteristic exceeds a threshold, the instructions, when executed may further configure the one or more processors of the computing device to output, for display, an updated widget region of the lock screen graphical user interface that includes a second widget.

The details of one or more examples are set forth in the accompanying drawings and the description below. Other features, objects, and advantages of the disclosure will be apparent from the description and drawings, and from the claims.

DETAILED DESCRIPTION

Examples described in this disclosure relate to techniques that can enable a computing device to receive user inputs at a presence-sensitive screen when the computing device is in a limited access state (e.g., a "locked" state). In some implementations, the computing device, while in the limited access state, can output for display at the presence-sensitive screen, a lock screen graphical user interface that prevents access to general applications and information stored at the computing device. Rather than require a user to "unlock" the computing device to access specific information stored at the computing device, the techniques may enable the computing device to remain in the limited access state while providing access to one or more widgets (i.e., specific applications that perform a limited or a specific function) from the lock screen.

The techniques may enable the computing device to output a widget region as part of the lock screen graphical user interface, from which, the user can access one or more widgets. To prevent a user from accidentally activating the widget region, the computing device may require the user to enable the widget region by intentionally performing a unique gesture input at the presence-sensitive screen. The computing device may analyze a characteristic (e.g., location, direction, length, acceleration, velocity, etc.) of the input to determine whether the user intentionally enabled the widget region. The computing device may activate the widget region if, based on the characteristic of the user input, the computing device determines the user intentionally enabled the widget region.

By analyzing the characteristic of the gesture before enabling the widget region in this way, the computing device may discern intentional from unintentional user input, and allow a user to quickly access specific applications and information stored at the computing device without compromising the benefits of locking techniques. Such a computing device may perform fewer operations in response to unintentional user inputs and as a result, consume less electrical power.

Figure 1:
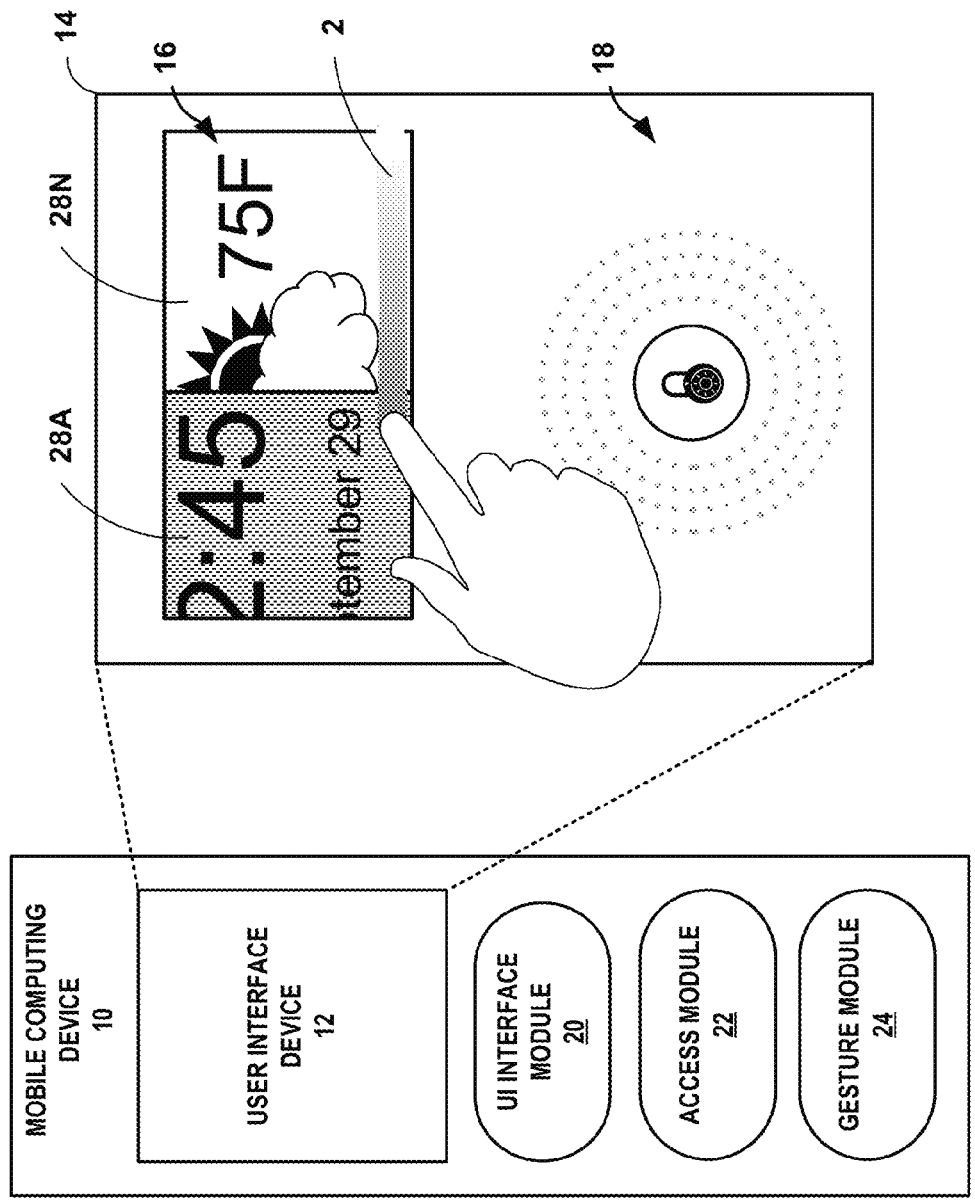
FIG. 1 is a conceptual diagram illustrating an example computing device that is configured to display one or more widgets within a widget region of a lock screen user interface, in accordance with one or more aspects of the present disclosure.

FIG. 1 is a conceptual diagram illustrating an example computing device that is configured to display one or more widgets within a widget region on a lock screen user interface, in accordance with one or more aspects of the present disclosure. In the example of FIG. 1, computing device 10 is a mobile phone. However, in other examples, computing device 10 may be a tablet computer, a personal digital assistant (PDA), a laptop computer, a portable gaming device, a portable media player, an e-book reader, a watch, or another type of portable or mobile computing device.

As shown in FIG. 1, computing device 10 includes a user interface device (UID) 12. UID 12 of computing device 10 may function as an input device for computing device 10 and as an output device. UID 12 may be implemented using various technologies. For instance, UID 12 may function as an input device using a resistive touchscreen, a surface acoustic wave touchscreen, a capacitive touchscreen, a projective capacitance touchscreen, a pressure sensitive screen, an acoustic pulse recognition touchscreen, or another presence-sensitive screen technology. UID 12 may function as an output device using any one or more of a liquid crystal display (LCD), dot matrix display, light emitting diode (LED) display, organic light-emitting diode (OLED) display, e-ink, or similar monochrome or color display capable of outputting visible information to the user of computing device 10.

UID 12 of computing device 10 may include a presence-sensitive screen that may receive tactile user input from a user of computing device 10. UID 12 may receive the tactile user input by detecting one or more taps and/or gestures from a user of computing device 10 (e.g., the user touching or pointing to one or more locations of UID 12 with a finger or a stylus pen). The presence-sensitive screen of UID 12 may present output to a user. UID 12 may present the output as a user interface which may be related to functionality provided by computing device 10. For example, UID 12 may present various functions and applications executing on computing device 10 such as an electronic message application, a map application, etc. UID 12 may present one or more widgets that perform specific functions or access a specific service on computing device 10.

Computing device 10 may include user interface ("UI") module 20, access module 22, and gesture module 24. Modules 20, 22, and 24 may perform operations described herein using software, hardware, or a mixture of both hardware and software residing in and executing on computing device 10. Computing device 10 may execute modules 20, 22, and 24 with multiple processors. Computing device 10 may execute modules 20, 22, and 24 as a virtual machine executing on underlying hardware.

UI module 20 may cause UID 12 to present lock screen graphical user interface 14 ("user interface 14") while computing device 10 operates in a limited access state. User interface 14 includes graphical elements displayed at various locations of UID 12. FIG. 1 illustrates two different regions of user interface 14. Widget region 16 of user interface 14 and unlock region 18 of user interface 14 each include graphical elements related to different functionality of computing device 10. For example, widget region 16 includes overlapping widgets 28A-28N (collectively "widgets 28") and unlock region 18 includes graphical elements related to an unlock function of computing device 10.

Unlock region 18 includes graphical elements related to unlocking computing device 10 when computing device 10 operates in a limited access state. For example, as described in more detail below, a user may input a gesture at a location of the presence-sensitive screen of UID 12 that presents unlock region 18. Based on the gesture, computing device 10 may exit the limited access state and enter a state that allows the user access to information and applications stored on computing device 10.

Widget region 16 includes widgets 28A-28N (collectively widgets 28). Each of widgets 28 represent a component of user interface 14 from which a user can perform a function, execute an application, or access a service using computing device 10. For example, FIG. 1 illustrates widget 28A as a clock widget that causes UID 12 to present a current time and date on a presence-sensitive screen. Widget 28N is one example of a weather widget that causes UID 12 to present a current temperature or weather forecast at the presence-sensitive screen. Widgets 28 may include a variety of widgets each representing a component of user interface 14 from which a user can perform a specific function or accesses a specific service on computing device 10. For example, widgets 28 may include a clock widget, a calendar widget, and a weather widget. Computing device 10 may allow a user or developer to customize each of widgets 28 or download and install widgets from a widget repository (e.g., located on the Internet) onto computing device 10. Widget 28A may, for example, include a read-only widget. A read-only widget may provide limited functionality for interacting with the user or receiving user input. For example, a clock widget may be a read-only widget if the clock widget only allows a user to view widget 28A when presented at the presence-sensitive screen of UID 12. An electronic mail (e-mail) widget however is an example of a non-read-only widget since a user may interact with the e-mail widget by providing inputs to the e-mail widget to view, delete, send, and edit e-mail.

Gesture module 24 of computing device 10 may receive an indication of user input received at the presence-sensitive screen of UID 12 and determine the user input corresponds to an indication of a gesture. Gesture module 24 may determine that the user input corresponds to a gesture performed at the presence-sensitive screen of UID 12 when a user swipes a finger or a stylus pen from one location at the presence-sensitive screen of UID 12 to a second location.

For example, UID 12 may virtually overlay a grid of coordinates onto the presence-sensitive screen. The grid may assign a coordinate that includes a horizontal component (X) and a vertical component (Y) to each location. Each time UID 12 detects user input at the presence-sensitive screen, gesture module 24 may receive information from UID 12. The information may include one or more coordinate locations and associated times indicating to gesture module 24 both, where UID 12 receives (or detects) user input at the presence-sensitive screen, and when UID 12 receives (or detects) user input.

Gesture module 24 may assemble the information received from UID 12 into a time-ordered sequence of motion events. Each motion event in the sequence may include a location component as the coordinate location of the user input, a time component as the time associated with the user input, and an action component. The action component may indicate whether the motion event corresponds to a push down at the presence-sensitive screen or a lift up at the presence-sensitive screen.

Gesture module 24 may determine the action component of the first motion event in the sequence corresponds to a push down event. Gesture module 24 may determine the action component of a current motion event in the sequence (different from and subsequent to the first motion event) based on a previous motion event in the sequence. Gesture module 24 may compare the time and location components of the current motion event with the time and location components of a previous motion event. Gesture module 24 may determine that a large difference in time and/or distance (e.g., 10 milliseconds and/or 10 pixels) between two motion events indicates a lift up event, followed by a push down event. Gesture module 24 may identify a start location of a gesture as the location component of a first motion event in the sequence with a push down action component. Gesture module 24 may identify an end location of a gesture as the location component of a first motion event in the sequence with a lift up action component. Gesture module 24 may identify a start location of a second subsequent gesture as the location component of a first motion event in the sequence with a push down action component that follows a motion event in the sequence with a lift up action component. Based on the sequence of motion events, gesture module 24 may determine the user input corresponds to a gesture and may determine a characteristic of the user input including a length, a shape, a velocity, and an acceleration.

Gesture module 24 may determine a length of a gesture as a distance at the presence-sensitive screen between the start location of the gesture and the location component of the last motion event in the sequence that occurs prior to the motion event in the sequence that includes the end location of the gesture. Gesture module 24 may determine a length of a gesture before detecting an end of the gesture. For example, the length of a gesture may increase as the location components of motion events in the sequence move away from the start of the gesture. And prior to the end of the gesture, the length of the gesture may decrease as the location components of the motion events in the sequence move toward the start location of the gesture.

Gesture module 24 may determine a shape of a gesture as a linear shape, an arc shape, etc. Gesture module 24 may determine the shape of the gesture as a linear shape by analyzing the locations of the motion events in the sequence and determining a common linear plane associated with each location of the motion events at the presence-sensitive screen. Gesture module 24 may determine a common linear plane between ninety percent of the locations of the motion events in the sequence and determine the locations sufficiently approximate a linear shape. Gesture module 24 may further differentiate between a horizontal linear shape and a vertical linear shape (e.g., by identifying the common linear between the locations to correspond to horizontal or vertical locations at the presence-sensitive screen).

Gesture module 24 may determine the shape of the gesture as an arc shape by analyzing the locations of the motion events in the sequence and determine a common centroid point at the presence-sensitive screen and common distance (i.e., radius) from the centroid point to the locations of each motion event. Gesture module 24 may determine a common centroid and distance between ninety percent of the locations of the motion events in the sequence and determine the locations sufficiently approximate an arc shape.

Gesture module 24 may determine a velocity of the gesture by analyzing the motion events in the sequence to determine velocity as the length of the gesture divided by an elapsed time of the gesture. As discussed above, gesture module 24 may determine the length of the gesture, the start location of the gesture, and the end of the gesture. When gesture module determines the start location of the gesture, gesture module 24 may also determine a start time of the gesture. Gesture module 24 may determine the start time of the gesture corresponds to the time component of the motion event in the sequence corresponding to the start location of the gesture.

When gesture module determines the end location of the gesture, gesture module 24 may also determine an end time of the gesture. Gesture module 24 may determine the end time of the gesture corresponds to the time component of the motion event in the sequence corresponding to the end location of the gesture. Gesture module 24 may determine the elapsed time of the gesture as a difference between the start time and the end time of the gesture. Gesture module 24 may determine the velocity of the gesture as the length of the gesture divided by the elapsed time of the gesture.

Gesture module 24 may determine an acceleration of the gesture by analyzing each of the motion events in the sequence to determine a change in velocity between successive motion events in the sequence over the elapsed time period of the gesture. For example, gesture module 24 may determine an elapsed time and a distance at the presence-sensitive screen between two motion events. Gesture module 24 may determine the velocity between these two motion events in a manner described above. Gesture detect module may determine the velocity between each successive pair of motion events in the sequence (e.g., velocity between a first and second motion event, a velocity between a second and third motion event, etc.). Gesture module 24 may analyze the velocity between each successive pair of motion events and determine a delta between velocities consecutive successive pairs (e.g., delta between the velocity of the first and second motion events and the velocity of the second and third motion events). Gesture module 24 may determine the acceleration of the gesture during the elapsed time as being the average delta between velocities of consecutive successive pairs of motion events in the sequence. Gesture module 24 may determine the gesture has a positive acceleration that increases in velocity over time, a negative acceleration that decreases in velocity over time, or a near zero acceleration with a velocity that remains constant.

Access module 22 may control access to applications and information stored on computing device 10. For example, while computing device 10 operates in a limited access state and UI module 20 causes UID 12 to present user interface 14, access module 22 may determine, based on user inputs detected by gesture module 24, whether to cause computing device 10 to exit the limited access state or to remain in the limited access state. For example, gesture module 24 may determine from information received by UID 12 that the user input represents a gesture. Gesture module 24 may determine the start location of the gesture corresponds to a location at the presence-sensitive screen of UID 12 that presents unlock region 18. Based on the start location of the gesture and the characteristic of the gesture determined by gesture module 24, access module 22 may determine that the gesture represents a user input to unlock computing device 10. Access module 22 may cause computing device 10 to exit the limited access state and enter a different state where the user can access information and applications stored on computing device 10.

Conversely, gesture module 24 may determine a start location of the user input as a location at the presence-sensitive screen of UID 12 that presents widget region 16 or some location at the presence-sensitive screen of UID 12 other than where UID 12 presents unlock region 18. Access module 22 may determine that the gesture does not represent a user input to unlock computing device 10 and access module 22 may cause computing device 10 to remain in the limited access state where the user cannot access information and applications stored on computing device 10.

In one example, UI module 20 may cause UID 12 to present user interface 14 for display at a presence-sensitive screen. UI module 20 may include first widget 28A (e.g., a clock widget) in widget region 16. While computing device 10 presents user interface 14, gesture module 24 of computing device 10 may receive information from UID 12 about an indication of user input 2 received at a location of the presence-sensitive screen of UID 12. Based on information about user input 2 received from UID 12, gesture module 24 may determine user input 2 represents a gesture with a start location within a portion of the presence-sensitive screen of UID 12 at which widget region 16 is displayed. Gesture module 24 may determine a characteristic of user input 2 that includes a shape, a length, a velocity, and an acceleration of user input 2. For example, gesture module 24 may associate user input 2 to a sequence of motion events. Based on the sequence of motion events, gesture module 24 may determine the length of user input 2 spans a distance equal to two-thirds of the width of the presence-sensitive screen of UID 12. Gesture module 24 may determine the shape of user input 2 represents a linear shape, finding a common linear plane between ninety percent of each of the location components in the sequence of motion events. Gesture module 24 may determine the velocity of user input 2 as the length of user input 2 divided by an elapsed time of user input 2 (e.g., two-thirds of the screen width divided by a half second, etc.). Gesture module 24 may determine the acceleration of user input 2 as the average delta in velocity between consecutive, successive pairs of motion events in the sequence during the elapsed time. Gesture module 24 may assign an acceleration value (e.g., +1, 0, or −1) to user input 2 to indicate positive acceleration, no acceleration, or negative acceleration. The length of user input 2, the velocity of user input 2, the shape of user input 2, and the acceleration of user input 2 collectively represent the characteristic of user input 2.

Computing device 10 may use the characteristic of user input 2 in order to differentiate accidental user input from intentional user input. Computing device 10 may update user interface 14 upon the detection of intentional user input, but may not update user interface 14 upon the detection accidental user input. To identify intentional user input versus accidental user input, UI module 20 may compare the characteristic of user input 2 to a threshold and, if the characteristic exceeds the threshold, computing device 10 may determine user input 2 represents intentional user input.

For example, the threshold may include a shape component (e.g., a common linear plane between eighty percent of each of the location components in the sequence of motion events), a velocity component (e.g., fifty percent of the screen width divided by a half second), a length component (e.g., fifty percent of the width of the presence-sensitive screen of UID 12), and an acceleration component (e.g., a positive acceleration, a value of +1, etc.). Each threshold component represents a minimum value to compare against the characteristic of user input 2. UI module 20 may determine the length of user input 2 exceeds the length component of the threshold, UI module 20 may determine the velocity of user input 2 exceeds the velocity component of the threshold, etc. UI module 20 may determine the determined characteristic of user input 2 exceeds each component of the threshold. In response, UI module 20 may determine, based on the characteristic of user input 2, that the characteristic exceeds a threshold.

To enable interaction with widget region 16, UI module 20 may require the characteristic of user input 2 to exceed the minimum value of each length, shape, velocity, and acceleration component of the threshold in order to require the user to provide a specific momentum, inertia, or force when providing user input 2 at the presence-sensitive screen of UID 12. The characteristic of an accidental user input may not exceed each component of the threshold. For example, accidental user input 2 may move slowly across the presence-sensitive screen and may not exceed the velocity component of the threshold. Accidental user input 2 may stops and restarts during the input and may not exceed the length or the acceleration component of the threshold. By requiring that the characteristic of user input 2 exceed each component of the threshold, UI module 20 may not update widget region 16 of user interface 14 in response to accidental user input 2.

Responsive to determining that the characteristic exceeds the threshold, UI module 20 may cause computing device 10 to output an updated widget region 16 of user interface 14 that includes second widget 28N (e.g., a weather widget). For example, if UI module 20 determines the characteristic of user input 2 represents an intentional user input with a length, a shape, a velocity, and an acceleration that exceeds the minimum threshold, UI module 20 may cause UID 12 to present user interface 14 with widget 28A (e.g., a clock widget) sliding out of widget region 16 and widget 28N sliding into widget region 16. Furthermore, because access module 22 did not determine user input 2 represented a user input to unlock computing device 10, UI module 20 may continue to cause UID 12 to output lock screen graphical interface 14 including unlock region 18. In this way, upon detection of intentional user input 2, computing device 10 may cause UID 12 to present multiple widgets 28 in a lock screen graphical user interface 14. In addition and despite user input 2, computing device 10 may remain in a limited access state thus preventing the user from accessing information and applications stored on computing device 10.

Figure 2:
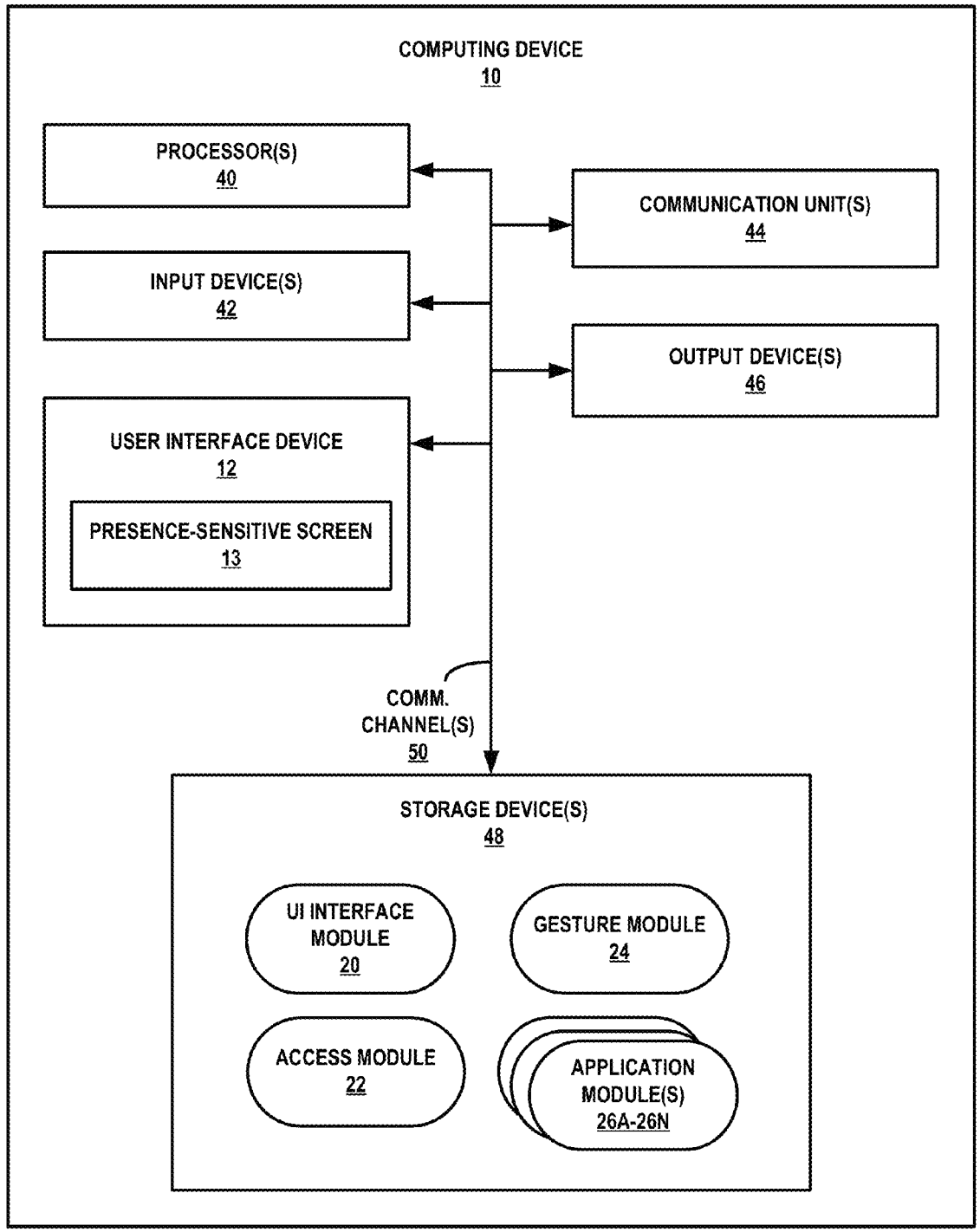
FIG. 2 is a block diagram illustrating an example computing device, in accordance with one or more aspects of the present disclosure.

FIG. 2 is a block diagram illustrating an example computing device, in accordance with one or more aspects of the present disclosure. Computing device 10 of FIG. 2 is described below within the context of FIG. 1. FIG. 2 illustrates only one particular example of computing device 10, and many other examples of computing device 10 may be used in other instances and may include a subset of the components included in example computing device 10 or may include additional components not shown in FIG. 2.

As shown in the example of FIG. 2, computing device 10 includes user interface device 12 ("UID 12"), one or more processors 40, one or more input devices 42, one or more communication units 44, one or more output devices 46, and one or more storage devices 48. In this example, UID 12 also includes presence-sensitive screen 13. Although shown in FIGS. 1 and 2 as a stand-alone computing device 10 for purposes of example, a computing-device may be any component or system that includes a processor 40 or other suitable computing environment for executing software instructions and, for example, need not include presence-sensitive screen 13.

Storage devices 48 of computing device 10 also include UI module 20, access module 22, gesture module 24, and application modules 26A-26N ("application modules 26"). Communication channels 50 may interconnect each of the components 12, 13, 20, 22, 24, 26, 40, 42, 44 and 46 for inter-component communications (physically, communicatively, and/or operatively). In some examples, communication channels 50 may include a system bus, a network connection, an inter-process communication data structure, or any other method for communicating data.

One or more input devices 42 of computing device 10 may receive input. Examples of input are tactile, audio, and video input. Input devices 42 of computing device 10, in one example, includes a presence-sensitive screen, touch-sensitive screen, mouse, keyboard, voice responsive system, video camera, microphone or any other type of device for detecting input from a human or machine.

One or more output devices 46 of computing device 10 may generate output. Examples of output are tactile, audio, and video output. Output devices 46 of computing device 10, in one example, includes a presence-sensitive screen, sound card, video graphics adapter card, speaker, cathode ray tube (CRT) monitor, liquid crystal display (LCD), or any other type of device for generating output to a human or machine.

One or more communication units 44 of computing device 10 may communicate with external devices via one or more networks by transmitting and/or receiving network signals on the one or more networks. For example, computing device 10 may use communication unit 44 to transmit and/or receive radio signals on a radio network such as a cellular radio network. Likewise, communication units 44 may transmit and/or receive satellite signals on a satellite network such as a GPS network. Examples of communication unit 44 include a network interface card (e.g. such as an Ethernet card), an optical transceiver, a radio frequency transceiver, a GPS receiver, or any other type of device that can send and/or receive information. Other examples of communication units 44 may include Bluetooth®, GPS, 3G, 4G, and Wi-Fi® radios found in mobile devices as well as Universal Serial Bus (USB) controllers.

UID 12 of FIG. 2 includes presence-sensitive screen 13 (hereafter "screen 13"). Computing device 10 may use UID 12 as an input device and an output device. For example, screen 13 of UID 12 may include a touchscreen configured to receive tactile user input from a user of computing device 10. Screen 13 of UID 12 may also include an LED display capable of outputting visible information to the user of computing device 10. UID 12 may present a user interface on screen 13, such as user interface 14 of FIG. 1, and other various functions and applications executing on computing device 10.

While illustrated as an internal component of computing device 10, UID 12 also represents and external component that shares a data path with computing device 10 for transmitting and/or receiving input and output. For instance, in one example, UID 12 represents a built-in component of computing device 10 located within and/or physically connected to the external packaging of computing device 10 (e.g., a screen on a mobile computer). In another example, UID 12 represents an external component of computing device 10 located outside and physically separated from the packaging of computing device 10 (e.g., a monitor, a projector, etc. that shares a wired and/or wireless data path with a tablet computer).

Application modules 26A-26N of computing device 10 may perform various functions or access one or more services for computing device 10. For example, each of widgets 28 of FIG. 1 may correspond to one of application modules 26A-26N. In other words, each of widgets 28 of FIG. 1 is actually an executable application module 26 that performs a specific function for computing device 10, such as displaying a current date, displaying a current time, displaying a weather forecast, or managing presentation and selection of images in a photo library. For instance, when UI module 20 includes widget 28A in user interface 14, UI module 20 receives formatted data from application module 26A associated with widget 28A (e.g., a current time and calendar day). Application modules 26 may represent the engines executing on computing device 10 that performs the specific functions associated with widgets 28.

One or more storage devices 48 within computing device 10 may store information required for use during operation of computing device 10 (e.g., application modules 26 computing device 10 may store configuration files accessed by application module 26 during execution on computing device 10). Storage devices 48, in some examples, have the primary purpose of being short term and not long-term computer-readable storage mediums. Storage devices 48 on computing device 10 may configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art. Storage devices 48 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 48 may store program instructions and/or data associated with UI module 20, access module 22, gesture module 24, and application modules 26.

One or more processors 40 may implement functionality and/or execute instructions within computing device 10. For example, processors 40 on computing device 10 may receive and execute instructions stored by storage devices 48 that execute the functionality of UI module 20, access module 22, gesture module 24, and application modules 26. These instructions executed by processors 40 may cause computing device 10 to store information, within storage devices 48 during program execution. Processors 40 may execute instructions of modules 20-26 to cause UID 12 to present lock screen graphical user interface 14 with widget region 16 and unlock region 18 on screen 13. That is, modules 20-26 may be operable by processors 40 to perform various actions, including detecting user input and causing UID 12 to present a user interface on screen 13, such as user interface 14 of FIG. 1.

In accordance with aspects of this disclosure computing device 10 of FIG. 2 may output lock screen graphical user interface 14. A user can access one or more widgets 26 while computing device 10 remains in a limited access state by providing intentional user input on screen 13, at a location where screen 13 presents widget region 16.

For instance, UI module 20 of computing device 10 may cause UID 12 to output user interface 14 of FIG. 1 at screen 13, which includes widget region 16, widget 28A, and unlock region 18. UI module 20 may send information about user interface 14 over communication channels 50. UID 12 may receive the information about user interface 14 and present user interface 14 including widget region 16, widget 28A, and unlock region 18 on screen 13.

Widget 28A may correspond to application module 26A that operate as a clock application. When UI module 20 includes widget 28A as part of user interface 14, UI module 20 may receive application information from application module 26A over communication channels 50. UI module 20 may analyze the application information and based on the information, UI module 20 may update user interface 14. For example, UI module 20 may receive application information from application module 26A that causes UI module 20 to update the time and day presented as widget 28A on screen 13.

UID 12 may detect a user input (e.g., user input 2 of FIG. 1) at screen 13. UID 12 may send information corresponding to the user input over communication channels 50 to gesture module 24. Gesture module 24 may assemble the information and determine UID 12 received an indication of user input 2 received at screen 13. From the information, gesture module 24 may determine user input 2 represents a gesture. Gesture module 24 may determine a start location of user input 2 and a current length of user input 2. The start location of user input 2 may correspond to a location on screen 13 that presents widget region 16.

Gesture module 24 may determine a characteristic of user input 2, including a shape, a length, a velocity, and an acceleration user input 2. For example, in the manner described above in the description of FIG. 1, gesture module 24 may analyze the information received from UID 12 about user input 2. Gesture module 24 may assemble the information into a sequence of motion events, each with a location component, a time component, and an action component. Based on the sequence of motion events, gesture module 24 may determine the length of user input 2 spans a distance equal to two-thirds of the width of screen 13. Gesture module 24 may determine the shape of user input 2 represents a linear shape by finding a common linear plane between ninety percent of each of the location components in the sequence of motion events. Gesture module 24 may determine the velocity of user input 2 as the length of user input 2 divided by an elapsed time of user input 2 (two-thirds of the screen width divided by a half second, etc.). Gesture module 24 may determine the acceleration of user input 2 as the average delta in velocity between consecutive, successive pairs of motion events in the sequence during the elapsed time. Gesture module 24 may assign an acceleration value (e.g., +1, 0, or −1) to user input 2 to indicate positive acceleration, no acceleration, or negative acceleration.

In response to gesture module 24 detecting and analyzing user input 2, UI module 20 may determine if the characteristic of user input 2 exceeds a threshold. In other words, based on the characteristic of user input 2 (the length, the shape, the velocity, and the acceleration of user input 2) UI module 20 may determine if the user input satisfies a threshold for equating user input 2 with an intentional input. UI module 20 may determine intentional input indicates a command from the user to include a second widget (e.g., widget 28N) in user interface 14. The threshold used by UI module 20 may include a minimum length component, a shape component, a minimum velocity component, and a minimum acceleration component.

The threshold may depend on the orientation of the first widget. For example, UI module 20 may determine the orientation of the first widget relative to locations on screen 13 represents a horizontal orientation (e.g., the first widget spans mostly horizontal locations on screen 13, or a user accesses the first widget by providing horizontal gestures on screen 13). UI module 20 may determine a horizontal linear shape of user input exceeds the shape component of the threshold, rather than a vertical linear shape of user input 2. Conversely, UI module 20 may determine the orientation of the first widget relative to locations on screen 13 represents a vertical orientation (e.g., the first widget spans mostly vertical locations on screen 13, or a user access the first widget by providing vertical gestures on screen 13). UI module 20 may determine a vertical linear shape of user input exceeds the shape component of the threshold, rather than a horizontal linear shape of user input 2.

UI module 20 may require the characteristic of user input 2 to exceed the threshold before UI module 20 modifies or updates user interface 14. For example, UI module 20 may compare the length of user input 2 to a minimum length (e.g., fifty percent of the width of screen 13). UI module 20 may compare the characteristic of user input 2 of each component of the threshold and determine the determined characteristic exceeds each threshold component.

UI module 20 may require the characteristic of user input 2 to exceed this threshold to ensure user input 2 represents an intentional input from the user to include a second widget (e.g. widget 28N) in user interface 14. A user input that does not have a characteristic that exceeds this threshold may have no effect on the appearance of user interface 14 as presented on screen 13. In any event, responsive to determining that the characteristic exceeds the threshold set by UI module 20, UI module 20 may cause UID 12 to output an updated widget region 16 of user interface 14 that includes second widget 28N on screen 13. For instance, FIG. 1 illustrates widget 28N sliding into user interface 14 as a user provides user input 2 at region 16 with a sufficient length, shape, velocity and acceleration to cause UID 12 to output widget 28N (e.g., a weather forecast widget corresponding to a weather forecast application 26N).

Updated widget region 16 of lock screen graphical user interface 14 may include the second widget in place of the first widget. For example, in causing UID 12 to output updated widget region 16 in response to user input 2, UI module 20 may cause UID 12 to present widget 28N in place of widget 28A so a user can only view and interact with widget 28N.

UI module 20 may cause UID 12 to output updated widget region 16 by presenting the second widget in place of the first widget with a transition. The transition may comprise a slide transition, a vertical blinds transition, and a fade transition. For example, in causing UID 12 to output updated widget region 16 in response to user input 2, UI module 20 may cause UID 12 to present widget 28N in place of widget 28A with a slide transition. In other words, screen 13 may present widget 28N sliding from right to left on screen 13, eventually overlapping all of widget 28A.

Subsequent to outputting updated widget region 16, a user may command computing device 10 to present subsequent widgets 28. For example, responsive to outputting updated widget region 16 including widget 28N, UID 12 of computing device 10 may detect a second user input at screen 13. Gesture module 24 may receive information about the second user input from UID 12 and assemble the information into a sequence of motion events. From the sequence of motion events, gesture module 24 may determine UID 12 received an indication of a second user input (subsequent to user input 2). Gesture module 24 may determine a characteristic of the second user input including a start location, a length, a shape, a velocity, and an acceleration of the second user input. Gesture module 24 may determine UID 12 detected the second user input at a location of the presence-sensitive screen corresponding to a location where screen 13 presents updated widget region 16.

Before updating widget region 16 to include subsequent widgets 28, UI module 20 may require the second user input to exceed a second threshold. UI module 20 may use the same threshold (e.g., having the same minimum length component, minimum shape component, minimum velocity component, and minimum acceleration component) as the threshold used in analyzing user input 2 or a different lesser threshold as the second threshold. For example, the second threshold may include a lesser minimum length component (e.g., a length of twenty-five percent instead of fifty percent of the width of screen 13).

Responsive to determining that the characteristic of the second user input exceeds the second threshold, UI module 20 may cause UID 12 to output a second updated widget region 16 of lock screen graphical user interface 14 that includes a third widget (e.g., widget 28B). In this way, computing device 10 may require the characteristic of user input 2 to exceed a threshold before outputting for display widget 28N in place of widget 28A, and require a second input to exceed a lesser threshold before outputting for display subsequent widgets 28.

UI module 20 may rely on the start location of user input 2 and the end location of user input 2 in determining whether the characteristic of user input 2 exceeds a threshold. Gesture module 24 may determine the start location and the end location of user input 2 by analyzing the sequence of motion events associated with user input 2. UI module 20 may receive the start and end locations of user input 2 from gesture module 24. In determining whether the characteristic of user input 2 exceeds a threshold, UI module 20 may compare the end location of user input 2 with a minimum end location included as a component of the threshold. In other words, the threshold may include a minimum end location X and Y component. If the end location of user input 2 includes X and Y component values that exceed the X and Y component values of the minimum end location, UI module 20 may determine user input 2 exceeds the threshold. For example, UI module 20 may require user input 2 to end at a location of screen 13 that presents an edge of widget region 16.

UI module 20 may cause UID 12 to output user interface 14 including widget region 16 and updated widget region 16 all while computing device 10 operates in a limited access state. In other words, computing device 10 may operate in a limited access state while outputting widget region 16 of lock screen graphical user interface 14 and computing device 10 may operate in the limited access state while outputting updated widget region 16 of lock screen graphical user interface 14. As described above, access module may determine when computing device 10 exits the limited access state and may not alter the operating state of computing device 10 in response to user input 2. In addition UI module 20 may cause UID 12 to continue to output unlock region 18 of graphical user interface 14 all while updating widget region 16. In other words, UI module 20 may modify user interface 14 and cause UID 12 to output updated widget region 16 of lock screen graphical user interface 14 and this modification may not modify unlock region 18 of lock screen graphical user interface 14.

A user, however, may command computing device 10 to transition out of the limited access state into an access state by providing a particular user input at a particular location of screen 13. For instance, gesture module 24 may receive information from UID 12 about a second user input (different from user input 2) and determine the information represents an indication of a second user input received at a second location of screen 13. Gesture module 24 may determine the start location of the second user input corresponds to a location of screen 13 that presents unlock region 18 of user interface 14. Access module 22 may receive information from gesture module 24 about the indication of the second user input. Responsive to receiving the indication of the second user input, access module 22 may cause computing device 10 to transition from the limited access state to an access state where the user may access applications and information stored on computing device 10.

After UI module 20 updates widget region 16 to include widget 28N and commands UID 12 to present widget 28N on screen 13, a user may command computing device 10 to revert back to the original widget region 16 and display widget 28A in place of widget 28N. For example, while computing device 10 presents user interface 14 including updated widget region 16, gesture module 24 of computing device 10 may receive information from UID 12 about an indication of a second user input received at a second location of screen 13. Based on information about the second user input received from UID 12, gesture module 24 may determine the second location represents a start location of the second user input. Responsive to gesture module 24 determining UID 12 received the second user input at the second location, UI module 20 may modify widget region 16 to include widget 28A in place of widget 28N. UI module 20 may cause UID 12 to outputting this updated widget region 16 in place of the updated widget region 16 first outputted in response to user input 2.

Although a user may command computing device 10 to revert back to the original widget region 16 and display widget 28A in place of widget 28N as described above, UI module 20 may require a characteristic of the second user input to exceed a second threshold. The second threshold can be the same or less than the original threshold used by computing device 10 to before displaying widget 28N in place of widget 28A. For example, while computing device 10 presents user interface 14 including updated widget region 16, gesture module 24 of computing device 10 may receive information from UID 12 about an indication of a second user input received at a second location of screen 13. Based on information about the second user input received from UID 12, gesture module 24 may determine the second location represents a start location of the second user input. Gesture module 24 may also determine a characteristic of the second user input. The characteristic may include, for example, at least one of a length, a velocity, an acceleration, a shape, etc.

UI module 20 may receive information about the second user input from gesture module 24, including the characteristic of the second user input. UI module 20 may compare the second user input to a second threshold. For example, the second threshold may include one or all of the components of the first threshold used in first modifying user interface 14 to include updated widget region 16. UI module 20 may compare the characteristic of the second user input to the second threshold and determine whether the characteristic of the second user input exceeds the second threshold. Responsive to determining that the characteristic of the second user input exceeds the second threshold, UI module 20 may modify user interface 14 and command UID 12 to output the original widget region 16 in place of the updated widget region 16 (e.g., replacing widget 28N with the widget 28A).

UI module 20 may reset and include widget 28A in user interface 14, after each power cycle of screen 13 and/or computing device 10, even if widget 28N was included in user interface 14 prior to the power cycle. For example, computing device 10 may include a mechanism for a user to turn-off power to screen 13 and/or computing device 10. A user may subsequently turn-on power to screen 13 and/or computing device 10. UI module 20 may determine a power cycle of screen 13 occurred, and in response, UI module 20 may update user interface 14 to include widget 28A in widget region 16 and remove all other widgets displayed on screen 13 previous to the power cycle. UI module 20 may likewise revert back to comparing user input 2 with the original threshold. In other words, UI module 20 may revert back to original user interface 14 and may require the characteristic of user input 2 to exceed the original threshold (not the second threshold).

FIGS. 3A-3D are conceptual diagrams illustrating example graphical user interfaces for presenting one or more widgets within a widget region of a lock screen user interface, in accordance with one or more aspects of the present disclosure. FIGS. 3A-3D are described below within the context of computing device 10 of FIG. 1 and FIG. 2. For example, computing device 10 may present user interfaces 310A-310D as shown in the examples of FIGS. 3A-3D.

Figure 3B:
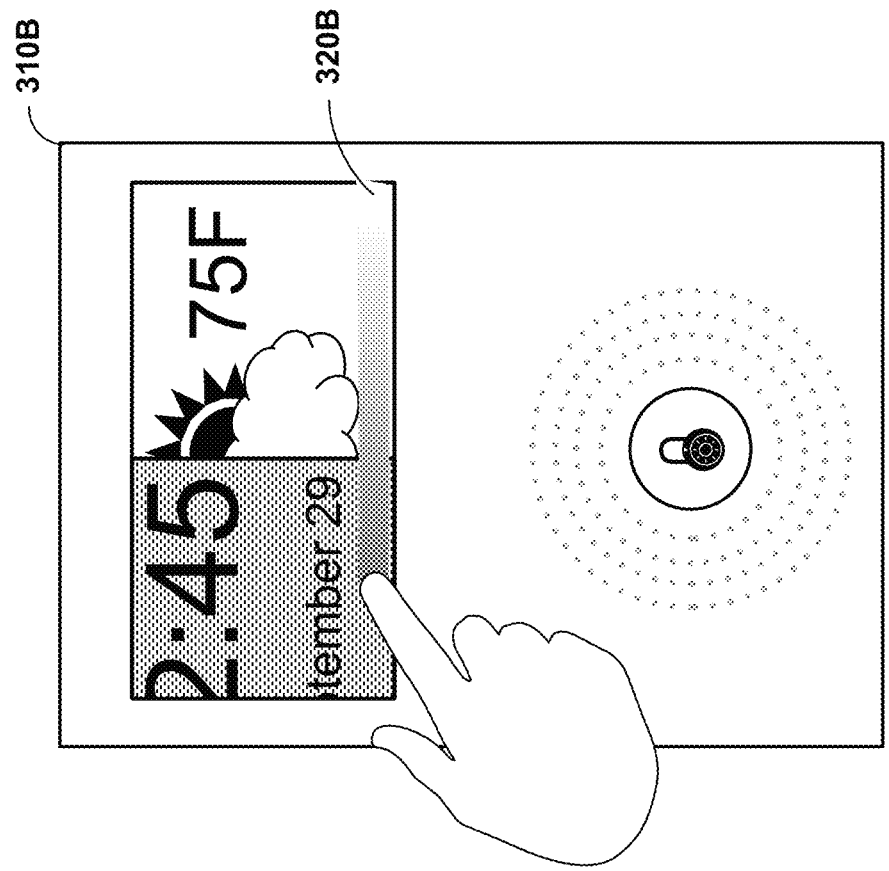
FIGS. 3A-3D are conceptual diagrams illustrating example graphical user interfaces for presenting one or more widgets within a widget region of a lock screen user interface, in accordance with one or more aspects of the present disclosure.
Figure 3A:
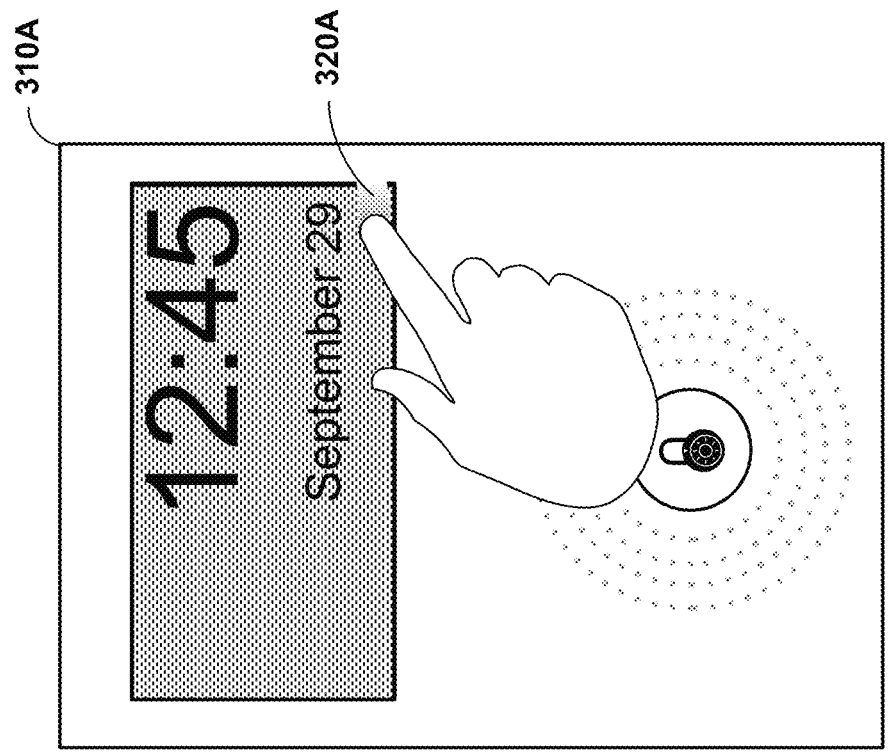

FIG. 3A illustrates user interface 310A that includes a widget region, an unlock region, and a first widget (i.e., a clock widget) within the widget region. FIG. 3A further illustrates that a user may provide user input 320A within a location on screen 13 that presents the widget region of user interface 310A. Gesture module 24 may receive information from UID 12 and determine the information indicated UID 12 detected user input 320A at a location of screen 13. Gesture module 24 may assemble the information into a time-ordered sequence of motion events detected screen 13. Each motion event in the sequence of motion events may comprise a location component, a time component, and an action component of a portion of user input 320A. The time component may represent a time when screen 13 detected the corresponding portion of user input 320A. Gesture module 24 may determine a start location of user input 320A as the location component of the first motion event in the sequence of motion events. Gesture module 24 may determine an end location of user input 320A as the location component of the last motion event in the sequence of motion events.

Gesture module 24 may determine a characteristic of user input 320A. The characteristic of user input 320A may include a length of user input 320A and a velocity of user input 320A. The length of user input 320A may represent a distance on screen 13 between the start location of user input 320A and the end location of user input 320A. Gesture module 24 may determine an elapsed time of user input 320A as the difference between the time component of the last motion event in the sequence of motion events and the time component of the first motion event in the sequence of motion events. Gesture module 24 may determine the velocity of user input 320A as a value corresponding to the length of the user input 320A divided by the elapsed time of the user input 320A.

In response to gesture module 24 detecting the indication of user input 320A, UI module 20 may determine whether the characteristic of user input 320A exceeds a threshold. If the characteristic exceeds a threshold, UI module may update the widget region of user interface 310A to include an updated widget region. The threshold may include a length component proportionate to a width of screen 13 (e.g., seventy percent of the width). UI module 20 may determine whether the characteristic of user input 320A exceeds the threshold by determining whether the length of the characteristic of user input 320A exceeds the length component of the threshold. The threshold may also include a velocity component. In analyzing whether user input 320A exceeds the threshold, UI module may determine whether the velocity of the characteristic of user input 320A exceeds the velocity component of the threshold.

UI module 20 may combine the different characteristics of user input 320A as a weighted characteristic value and likewise combine the different threshold components as a weighted threshold value and analyze whether the weighted characteristic value exceeds the weighted threshold value. For example, UI module 20 may determine, a user input with a velocity that far exceeds a velocity component of the threshold, exceeds the threshold even if the length of the user input does not exceed the length component of the threshold. In other words, even though the length of user input 320A may be short relative to the length component of the threshold (e.g., twenty-five percent of the width of the screen as compared to a seventy percent threshold), if the velocity, the acceleration, and the shape of user input 320A far exceed the velocity, acceleration, and shape components of the threshold, UI module 20 may determine the determined characteristic of user input 320A exceeds the threshold overall, and update the widget region of user interface 310A.

As illustrated by FIG. 3A, the length of user input 320A is short as compared to the width of screen 13. The location of user input 320A corresponds to a location on screen 13 that presents the widget region of user interface 310A. UI module 20 may determine the determined characteristic of user input 320A does not exceed the threshold and refrain from updating the widget region of user interface 310A in response computing device 10 detecting user input 320A.

Figure 3D:
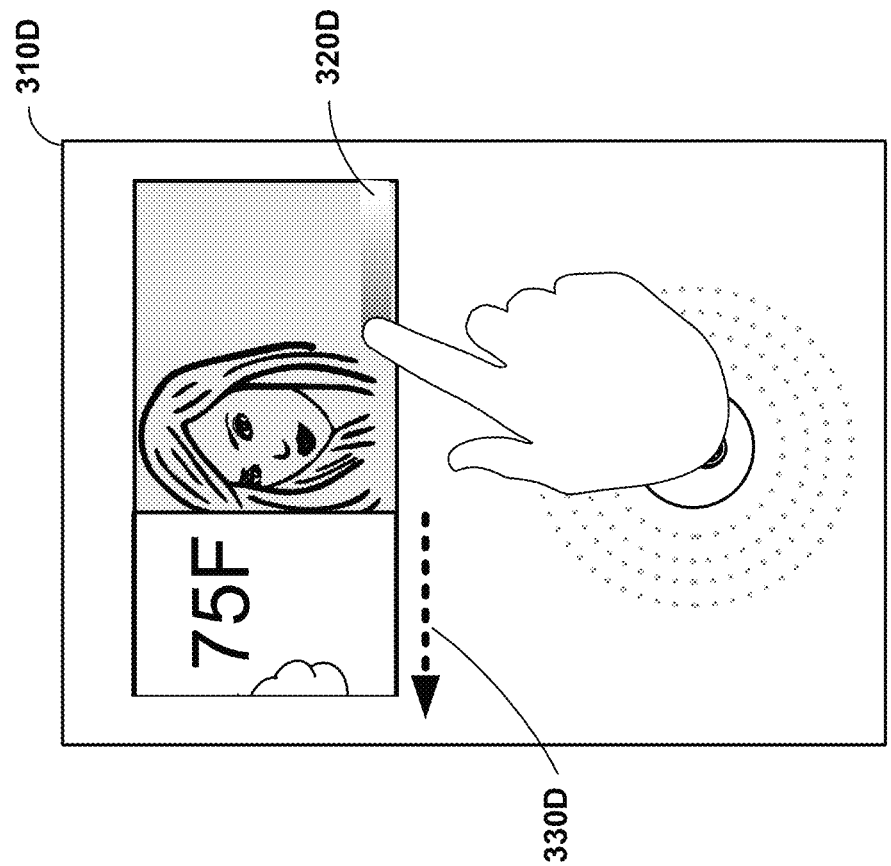
Figure 3C:
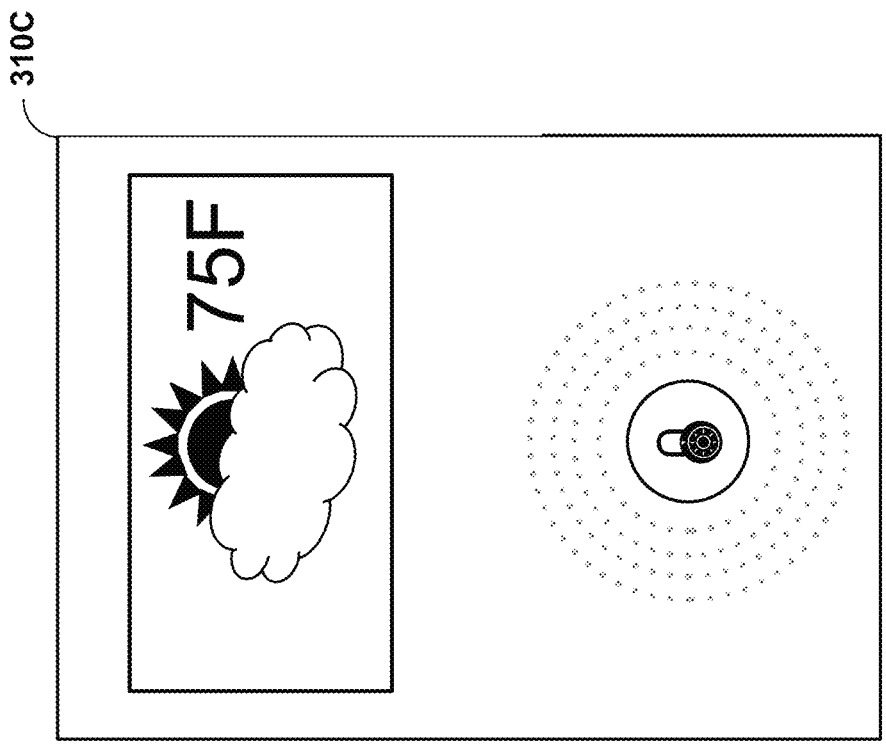

FIGS. 3B and 3C illustrate another example of one or more aspects of the present disclosure. FIG. 3B includes a user interface 310B that includes a widget region, an unlock region, and a first widget (i.e., a clock widget) within the widget region. FIG. 3B illustrates that a user may provide user input 320B within a location on screen 13 that presents the widget region of user interface 310B. Gesture module 24 may determine a characteristic of user input 320B including a length and a velocity. UI module 20 may determine the determined characteristic of user input 320B exceeds the threshold required to update the widget region because the length and the velocity of user input 320B exceed the length component of the threshold and the velocity component of the threshold. FIG. 3B illustrates UI module 20 causing screen 13 to present an updated widget region within user interface 310B that includes a second widget (a weather forecast widget) transitioning in place of the first widget (the clock widget). FIG. 3C illustrates user interface 310C after screen 13 finishes presenting the transition from the first widget to the second widget of user interface 310B from FIG. 3B.

FIG. 3D illustrates computing device 10 outputting a subsequent widget (e.g., a third widget) after detecting a second user input 320D at a location of screen 13. After UI module 20 causes screen 13 to display the updated widget region in user interface 310D, which includes the second widget, gesture module 24 may receive an indication of second user input 320D detected by screen 13 at a location corresponding to the updated widget region of user interface 310D. Gesture module 24 may determine the characteristic of second user input 320D. In response to determining the characteristic of second user input 320D, UI module 20 may determine whether the characteristic of second user input 320D exceeds a second threshold. In other words, UI module may require user input 310A and 310B to exceed a first threshold to include a second widget within an updated widget region of user interface 310A and 310B.

To include a third widget, subsequent to the second widget, UI module 20 may require second user input 320D to exceed a second threshold. In this case, the second threshold includes a length component proportionate to thirty percent of the width of screen 13. Gesture module 24 may determine a length of second user input 320D (e.g., gesture module 24 may determine the length of the second user input spans a distance equal to approximately thirty-five percent of the width of screen 13). UI module 20 may determine second user input 320D exceeds the second threshold. In response to second user input 320D exceeding the second threshold, UI module 20 may cause screen 13 to present a second updated widget region within user interface 310D. Right-to-left arrow 330D illustrates the third widget (e.g., a photo gallery widget) transitioning into view on screen 13 in place of the second widget (e.g., the weather forecast widget).

Figure 4:
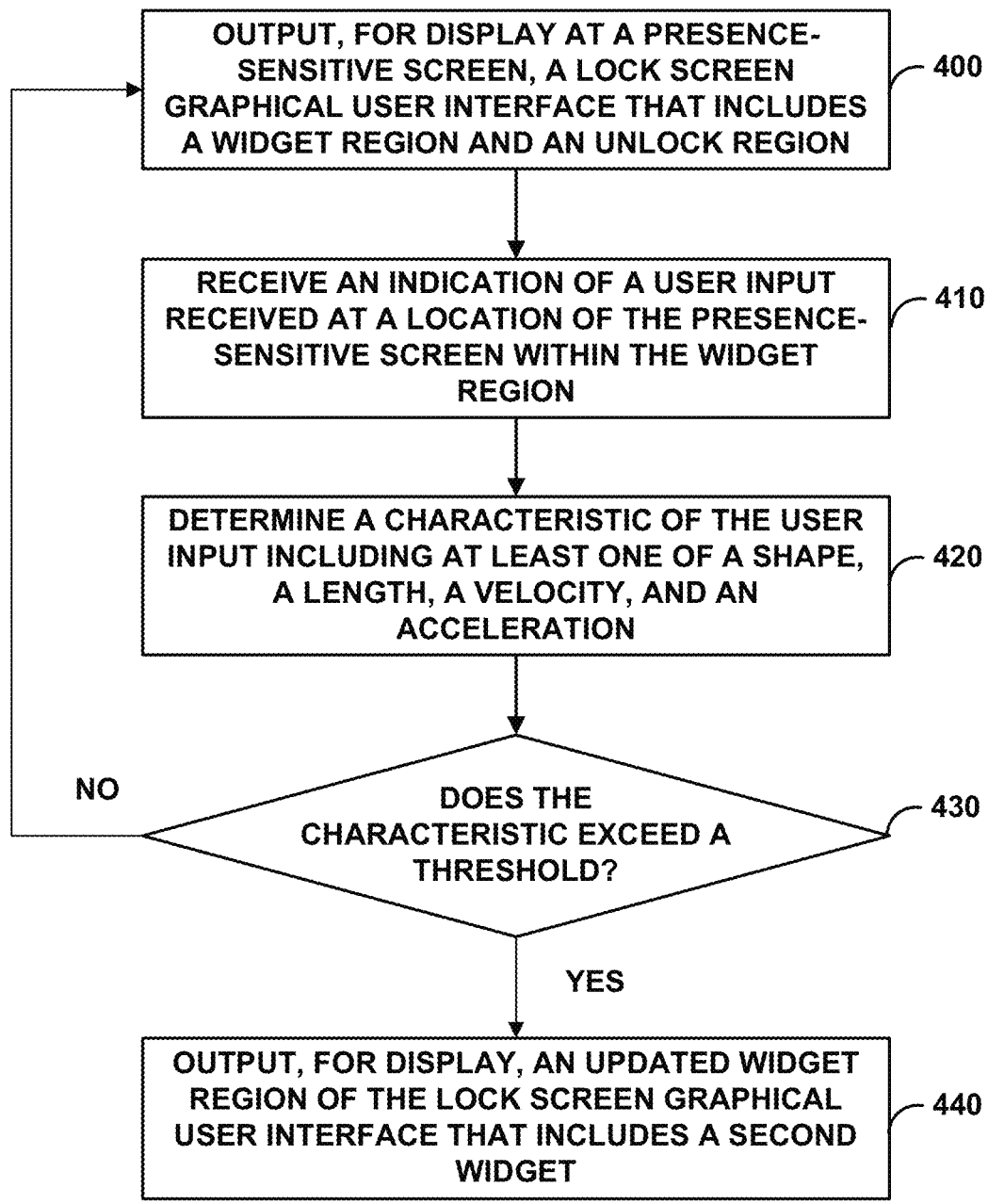
FIG. 4 is a flowchart illustrating an example operation of the computing device, in accordance with one or more aspects of the present disclosure.

FIG. 4 is a flowchart illustrating an example operation of the computing device, in accordance with one or more aspects of the present disclosure. The process of FIG. 4 may be performed by one or more processors of a computing device, such as computing device 10 illustrated in FIG. 1 and FIG. 2. For purposes of illustration, FIG. 4 is described below within the context of computing devices 10 of FIG. 1 and FIG. 2.

Computing device 10 may output, for display at a presence-sensitive screen, a lock screen graphical user interface that includes a widget region and an unlock region (400). For example, in a limited state of computing device 10, UI module 20 of computing device 10 may output at a presence-sensitive screen of UID 12, user interface 14 that includes widget region 16, widget 28A, and unlock region 18. Computing device 10 may receive an indication of a user input received at a location of the presence-sensitive screen within widget region (410). For example, UID 12 may receive user input 2 and gesture module 24 of computing device 10 may receive an indication of user input 2 from UID 12. Gesture module 24 may determine the location of user input 2 corresponds to a location of screen 13 that presents widget region 16.

Computing device 10 may determine a characteristic of the user input including at least one of a shape, a length, a velocity, and an acceleration (420). Gesture module 24 may determine user input 2 comprises a sequence of motion events that each includes a location component, a time component, and an action component. Based on the sequence of motion events, gesture module 24 may determine a characteristic of user input 2 that includes a shape, a length, a velocity, and an acceleration of user input 2.

Computing device 10 may determine whether the characteristic exceeds a threshold (430). For example, UI module 20 of computing device 10 may compare the characteristic of user input 2 to a threshold. UI module 20 may compare the velocity component, the acceleration component, the length component, and the shape component of the characteristic to a corresponding component of the threshold. If the characteristic does not exceed a threshold, computing device 10 may not update the lock screen graphical user interface. However if the characteristic does exceed the threshold, computing device 10 may output, for display, an updated widget region of the lock screen graphical user interface that includes a second widget (440). For example, if UI module 20 determines the each of the velocity component, the acceleration component, the length component, and the shape component of the characteristic exceed the corresponding component threshold, than UI module 20 may determine the determined characteristic exceeds the threshold. In response, UI module 20 may cause UID 12 to present an updated widget region 16 of user interface 14 that includes widget 28N.

Various embodiments of the invention have been described. These and other embodiments are within the scope of the following claims.

What is claimed is:

1. A method comprising:
    outputting, by a computing device and for display at a presence-sensitive screen, a lock screen graphical user interface, the lock screen graphical user interface including a widget region and an unlock region, the widget region including a first widget, and the unlock region including one or more graphical elements related to unlocking the computing device, such that the computing device selectively transitions, based on a gesture detected within a region of the presence-sensitive screen corresponding to the unlock region, from a limited access state to an access state, and wherein the widget region and the unlock region are non-overlapping regions;
    receiving, by the computing device, an indication of a user input initiated at a location of the presence-sensitive screen corresponding to a location within the widget region of the lock screen graphical user interface;
    determining, by the computing device and based on the indication of the user input, a characteristic of the user input, the characteristic of the user input including at least one of a velocity and an acceleration;
    responsive to determining that the characteristic satisfies at least one of a velocity component of a threshold and an acceleration component of the threshold, determining, by the computing device, that the user input represents intentional input; and
    responsive to determining that the user input represents intentional input, outputting, by the computing device, for display, an updated lock screen graphical user interface including an updated widget region that includes a second widget.

2. The method of claim 1, wherein the determined characteristic of the user input comprises a length, the method further comprising determining, by the computing device, that the user input represents intentional input in response to determining that the length of the user input satisfies a length component of the threshold, wherein the length component of the threshold is proportionate to a width of the presence-sensitive screen.

3. The method of claim 1, further comprising determining, by the computing device, that the user input represents intentional input in response to determining that the velocity of the determined characteristic of the user input exceeds the velocity component of the threshold.

4. The method of claim 1, wherein the updated widget region of the lock screen graphical user interface includes the second widget in place of the first widget.

5. The method of claim 1, wherein the user input is a first user input, wherein the location of the presence-sensitive screen is a first location of the presence-sensitive screen, wherein the threshold is a first threshold, and wherein the updated widget region of the lock screen graphical user interface is a first updated widget region, the method further comprising:
    responsive to outputting the first updated widget region, receiving, by the computing device, an indication of a second user input initiated at a second location of the presence-sensitive screen corresponding to a location within the first updated widget region of the lock screen graphical user interface;

determining, by the computing device and based on the indication of the second user input, a characteristic of the second user input including at least one of a velocity of the second user input and an acceleration of the second user input;

determining, based on the characteristic of the second user input and by the computing device, that the characteristic of the second user input satisfies at least one of a velocity component of a second threshold or an acceleration component of the second threshold; and responsive to determining that the determined characteristic of the second user input satisfies the second threshold, outputting, by the computing device, for display, a second updated widget region of the lock screen graphical user interface that includes a third widget.

6. The method of claim 5, wherein the second threshold is less than the first threshold.

7. The method of claim 1, wherein the characteristic of the user input includes an end location at which the user input was terminated.

8. The method of claim 1, wherein the computing device operates in a limited access state while outputting the widget region of the lock screen graphical user interface, and wherein the computing device operates in the limited access state while outputting the updated lock screen graphical user interface including the updated widget region.

9. The method of claim 8, wherein the user input is a first user input and the location of the presence-sensitive screen is a first location of the presence-sensitive screen, the method further comprising:

receiving, by the computing device, an indication of a second user input initiated at a second location of the presence-sensitive screen corresponding to a location within the unlock region; and responsive to receiving the indication of the second user input, transitioning, based at least in part on the second user input and by the computing device, from the limited access state to the access state.

10. The method of claim 1, wherein the first widget is a read-only widget.

11. The method of claim 1, wherein at least one of the first widget and the second widget comprise a customizable widget from a widget repository.

12. The method of claim 1, wherein outputting the updated lock screen graphical user interface including the updated widget region does not modify the unlock region of the lock screen graphical user interface.

13. The method of claim 1, wherein the user input is a first user input, and wherein the location of the presence-sensitive screen is a first location of the presence-sensitive screen, the method further comprising:

responsive to outputting the first updated widget region, receiving, by the computing device, an indication of a second user input received at a second location of the presence-sensitive screen; and responsive to receiving the second user input at the second location, outputting, by the computing device, the widget region that includes the first widget in place of the updated widget region that includes the second widget.

14. The method of claim 1, wherein the user input is a first user input, wherein the location of the presence-sensitive screen is a first location of the presence-sensitive screen, wherein the updated widget region is a first updated widget region, and wherein the threshold is a first threshold, the method further comprising:

responsive to outputting the first updated widget region, receiving, by the computing device, an indication of a second user input received at a second location of the presence-sensitive screen corresponding to a location within the updated widget region;

determining, based on the indication of the second user input and by the computing device, a characteristic of the second user input; and responsive to determining that the characteristic of the second user input satisfies a second threshold, outputting, by the computing device, for display, a second updated widget region that includes a third widget in place of the first updated widget region that includes the second widget.

15. The method of claim 1, wherein outputting the updated lock screen graphical user interface including the updated widget region further comprises:

outputting, by the computing device, for display, the second widget in place of the first widget with a transition, wherein the transition comprises at least one of a slide transition, a vertical blinds transition, and a fade transition.

16. The method of claim 1, further comprising:

responsive to determining that the characteristic does not satisfy at least one of the velocity component of the threshold or the acceleration component of the threshold, determining, by the computing device, that the user input represents unintentional input; and responsive to determining that the user input represents unintentional input, refraining from outputting, by the computing device, for display, the updated lock screen graphical user interface including the updated widget region that includes the second widget.

17. The method of claim 1, wherein the characteristic of the user input comprises a shape, the method further comprising determining, by the computing device, that the user input represents intentional input in response to determining that the shape of the user input satisfies a shape component of the threshold.

18. The method of claim 1, further comprising determining, by the computing device, that the user input represents intentional input in response to determining that the acceleration of the determined characteristic of the user input exceeds the acceleration component of the threshold.

19. A computing device comprising one or more processors, the one or more processors being configured to:

output, for display at a presence-sensitive screen, a lock screen graphical user interface, the lock screen graphical user interface including a widget region and an unlock region, the widget region including a first widget, and the unlock region including one or more graphical elements related to unlocking the computing device, such that the computing device selectively transitions, based on a gesture detected within a region of the presence-sensitive screen corresponding to the unlock region, from a limited access state to an access state, and wherein the widget region and the unlock region are non-overlapping regions;

receive, an indication of a user input initiated at a location of the presence-sensitive screen within the widget region of the lock screen graphical user interface;

determine, based on the indication of the user input, a characteristic of the user input, the characteristic of the user input including at least one of a velocity and an acceleration; and responsive to determining that the characteristic satisfies at least one of a velocity component of a threshold or an acceleration component of the threshold, determining that the user input represents intentional input; and responsive to determining that the user input represents intentional input, output, for display, an updated lock screen graphical user interface including an updated widget region that includes a second widget.

20. A non-transitory computer-readable storage medium comprising instructions that, when executed, configure one or more processors of a computing device to:

output, for display at a presence-sensitive screen, a lock screen graphical user interface, the lock screen graphical user interface including a widget region and an unlock region, the widget region including a first widget, and the unlock region including one or more graphical elements related to unlocking the computing device, such that the computing device selectively transitions, based on a gesture detected within a region of the presence-sensitive screen corresponding to the unlock region, from a limited access state to an access state, and wherein the widget region and the unlock region are non-overlapping regions;

receive, an indication of a user input initiated at a location of the presence-sensitive screen within the widget region of the lock screen graphical user interface;

determine, based on the indication of the user input, a characteristic of the user input, the characteristic of the user input including at least one of a velocity and an acceleration; and responsive to determining that the characteristic satisfies at least one of a velocity component of a threshold or an acceleration component of the threshold, determining that the user input represents intentional input; and responsive to determining that the user input represents intentional input, output, for display, an updated lock screen graphical user interface including an updated widget region that includes a second widget.

\* \* \* \* \*